United States Patent
Ryu et al.

(10) Patent No.: US 12,549,293 B2
(45) Date of Patent: Feb. 10, 2026

(54) HYBRID AUTOMATIC REPEAT REQUEST (HARQ) PROCESS NUMBER INDICATION FOR MULTI-CELL SCHEDULING

(71) Applicant: QUALCOMM Incorporated, San Diego, CA (US)

(72) Inventors: Jae Ho Ryu, San Diego, CA (US); Kazuki Takeda, Minato-ku (JP); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 18/187,854

(22) Filed: Mar. 22, 2023

(65) Prior Publication Data

US 2023/0412317 A1   Dec. 21, 2023

Related U.S. Application Data

(60) Provisional application No. 63/353,242, filed on Jun. 17, 2022.

(51) Int. Cl.
  *H04W 72/23*  (2023.01)
  *H04L 1/1829*  (2023.01)
  *H04L 5/00*  (2006.01)

(52) U.S. Cl.
  CPC ........... *H04L 1/1854* (2013.01); *H04L 5/001* (2013.01)

(58) Field of Classification Search
  CPC ...... H04L 1/1822; H04L 1/1854; H04L 5/001
  See application file for complete search history.

(56) References Cited

U.S. PATENT DOCUMENTS

2019/0215104 A1 *   7/2019   Salem .................. H04W 80/02
2020/0252168 A1 *   8/2020   Kim .................. H04W 72/1268

FOREIGN PATENT DOCUMENTS

WO   WO-2020214950 A1 * 10/2020 ............ H04W 72/23
WO   WO-2020252174 A1 * 12/2020 ............ H04W 72/23

* cited by examiner

*Primary Examiner* — Phuc H Tran
(74) *Attorney, Agent, or Firm* — Holland & Hart LLP

(57) ABSTRACT

Methods, systems, and devices for wireless communications are described. Some wireless communications systems may support hybrid automatic repeat request (HARQ) process number indication for multi-cell scheduling. In some cases, a user equipment (UE) may receive first control signaling including one or more parameters associated with a HARQ process. Additionally, the UE may receive second control signaling indicating scheduling information associated with a set of component carriers (CCs), where the scheduling information includes one or more HARQ process identifier (HPID) offsets, each associated with a respective CC. In some cases, the UE may determine an HPID associated with each CC of the set of CCs based on the one or more parameters in the first control signaling and a respective HPID offset from the one or more HPID offsets in the second control signaling.

30 Claims, 14 Drawing Sheets

HYBRID AUTOMATIC REPEAT REQUEST (HARQ) PROCESS NUMBER INDICATION FOR MULTI-CELL SCHEDULING

CROSS REFERENCE

The present Application for Patent claims the benefit of U.S. Provisional Patent Application No. 63/353,242 by RYU et al., entitled "HYBRID AUTOMATIC REPEAT REQUEST (HARQ) PROCESS NUMBER INDICATION FOR MULTI-CELL SCHEDULING," filed Jun. 17, 2022, assigned to the assignee hereof, and expressly incorporated herein.

FIELD OF TECHNOLOGY

The following relates to wireless communications, including hybrid automatic repeat request (HARQ) process number indication for multi-cell scheduling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support hybrid automatic repeat request (HARQ) process number indication for multi-cell scheduling. Generally, the techniques described herein may enable a user equipment (UE) to determine a separate HARQ process identifier (HPID) for each component carrier (CC) of a set of CCs scheduled for the UE by a network entity based on a respective HPID offset indicated in control signaling. For example, a UE may receive, from a network entity, first control signaling including one or more parameters associated with a HARQ process. For example, the one or more parameters may include a unit of HPID offset, a quantity of bits associated with an HPID offset field, or both. Additionally, the UE may receive second control signaling indicating scheduling information associated with a set of CCs. For example, the scheduling information may include an indication of a first HARQ process identifier associated with a first CC of the set of CCs and one or more HARQ process identifier offsets indicated in a respective HPID offset field, each associated with a remaining CC of the set of CCs.

In some cases, the UE may determine an HPID associated with each CC of the set of CCs based on the one or more parameters in the first control signaling and a respective HPID offset from the one or more HPID offsets indicated in the second control signaling. For example, the UE may determine a second HPID associated with a second CC of the set of CCs based on the first HPID associated with the first CC, a first HPID offset (e.g., associated with the second CC) from the one or more HPID offsets, and the one or more parameters (e.g., the unit of HPID offset). In some cases, the UE may transmit a set of feedback messages based on the determined HPIDs. That is, each feedback message of the set of feedback messages may be associated with a CC of the set of CCs and may be based on a respective HPID.

DETAILED DESCRIPTION

Some wireless communications systems may support techniques for scheduling transmissions for multiple cells (e.g., multiple component carriers (CCs)) using a single control message (e.g., downlink control message (DCI)). For example, a network entity may transmit a control message on a first CC and the control message may include scheduling information for a first transmission on the first CC, a second transmission on a second CC, and a third transmission on a third CC. In some cases, the control message may include joint (e.g., common) scheduling information for the multiple CCs. For example, the control message may include a single hybrid automatic repeat request (HARQ) process identifier (HPID) associated with the multiple CCs. However, indicating a joint HPID may reduce scheduling flexibility and, in some cases, increase the latency of communications. In some other cases, the control message may include separate (e.g., unique) scheduling information for each CC. For example, the control message may include a first HPID associated with the first CC, a second HPID associated with the second CC, and a third HPID associated with the third CC. However, indicating separate HPIDs per CC may increase overhead.

Techniques described herein may support enhanced HARQ process number (e.g., HPID) indication for multi-cell scheduling. In some cases, a UE may receive, from a network entity, a control message including scheduling information for a set of CCs, where the scheduling information includes an HPID indication. The HPID indication may indicate a first HPID for a first CC (e.g., cell) and one or more HPID offsets (e.g., per-CC HPID offsets) for additional CCs of the set of CCs. Additionally, the UE may determine an HPID for each additional CC of the set of CCs based on the first HPID for the first CC and a respective HPID offset. For example, the HPID indication may include a first HPID offset indicated via a first HPID offset field associated with a second CC. As such, the UE may determine a second HPID for the second CC based on the first HPID for the first CC and the first HPID offset. Transmission of HPID indications may result in improved scheduling flexibility with reduced overhead.

Aspects of the disclosure are initially described in the context of wireless communications systems. Aspects of the disclosure are then described in the context of a HARQ process number indication and a process flow. Aspects of the disclosure are further illustrated by and described with reference to apparatus diagrams, system diagrams, and flowcharts that relate to HARQ process number indication for multi-cell scheduling.

Figure 1:
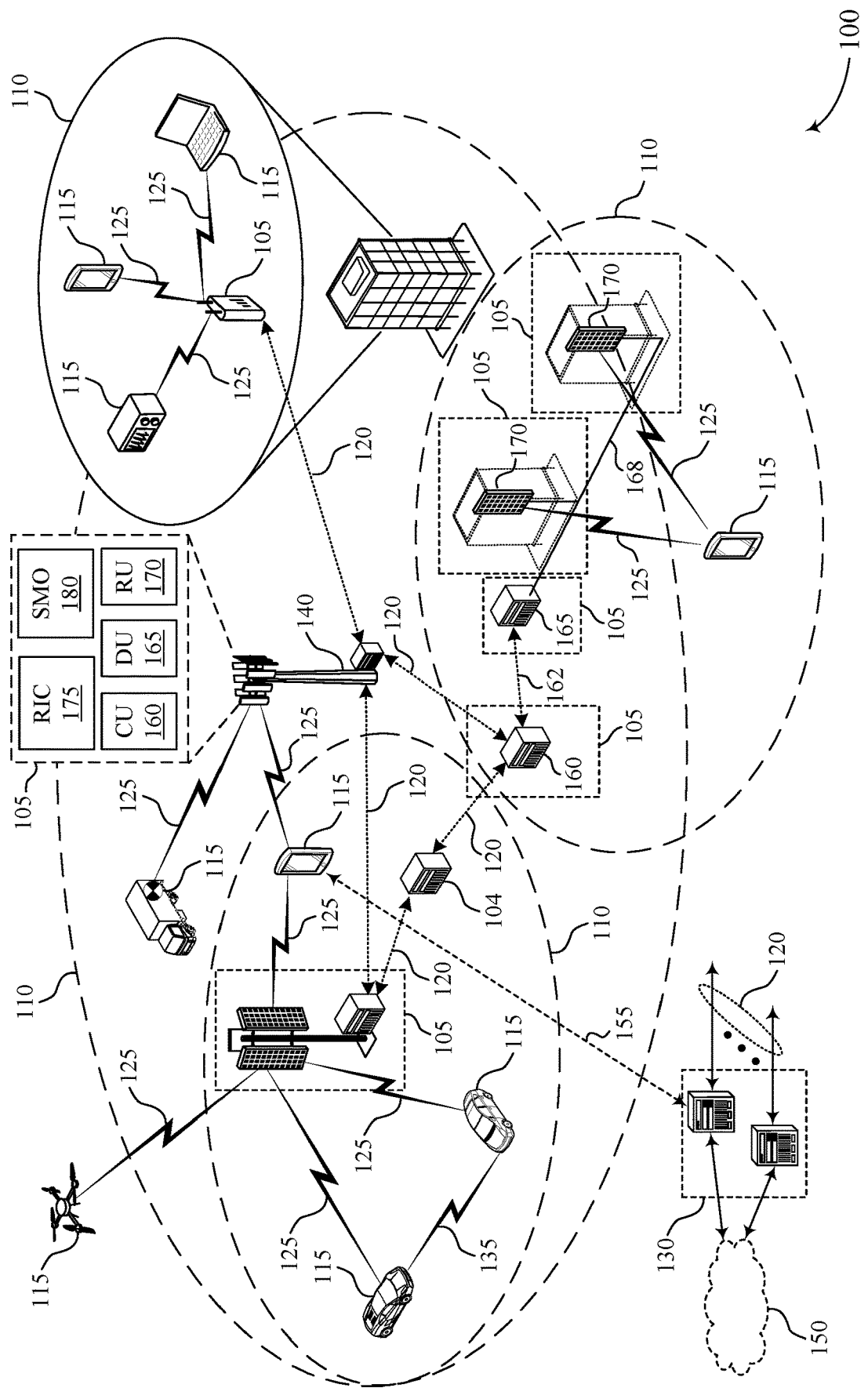
FIG. 1 illustrates an example of a wireless communications system that supports hybrid automatic repeat request (HARQ) process number indication for multi-cell scheduling in accordance with one or more aspects of the present disclosure.

FIG. 1 illustrates an example of a wireless communications system 100 that supports HARQ process number indication for multi-cell scheduling in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170).

In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support HARQ process number indication for multi-cell scheduling as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with CCs operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. HARQ feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some cases, the wireless communications system 100 may support enhanced HARQ process number (e.g., HPID) indication for multi-cell scheduling. For example, a UE 115 may receive, from a network entity 105, first control signaling indicating one or more parameters associated with a HARQ process. In some cases, the one or more parameters may include a quantity of bits associated with a HPID offset field (e.g., HPID offset field size), a unit of HPID offset, or both. Additionally, the UE 115 may receive, from the network entity 105, second control signaling indicating scheduling information associated with a set of CCs, such as an HPID indication (e.g., HARQ process number indication). For example, the HPID indication (e.g., indicated in the second control signaling) may include a first HPID associated with a first CC of the set of CCs and a respective HPID offset (e.g., relative to the first HPID) associated with each additional CC of the set of CCs. In some cases, the UE 115 may determine an HPID for each additional CC of the set of CCs based on the first HPID associated with the first CC, the one or more parameters, and the respective HPID offset. Use of HPID indications for multi-cell scheduling may result in a balance between scheduling flexibility and control signaling overhead (e.g., which may be configurable by the network entity 105 under different scenarios).

Figure 2:
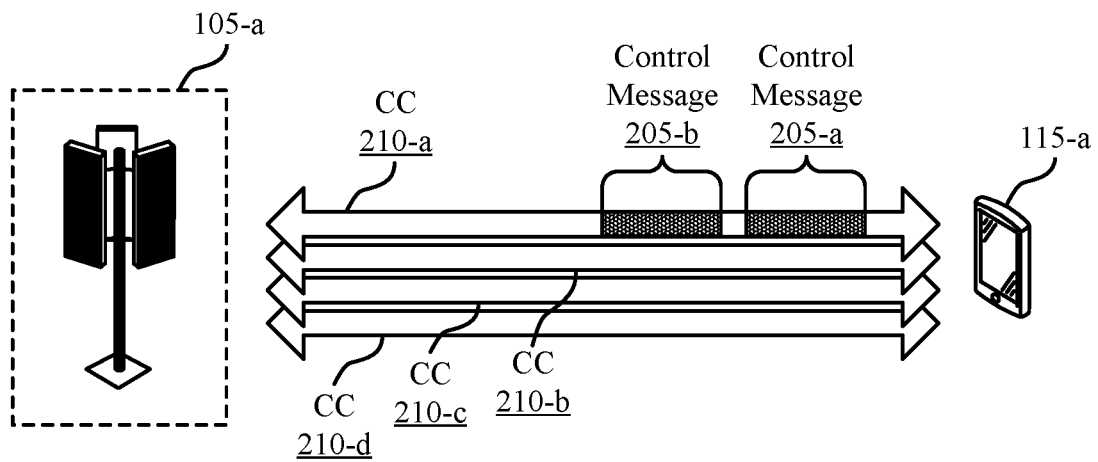
FIG. 2 illustrates an example of a wireless communications system that supports HARQ process number indication for multi-cell scheduling in accordance with one or more aspects of the present disclosure.

FIG. 2 illustrates an example of a wireless communications system 200 that supports HARQ process number indication for multi-cell scheduling in accordance with one or more aspects of the present disclosure. In some examples, the wireless communications system 200 may implement or be implemented by aspects of the wireless communications system 100. For example, the wireless communications system 200 may be implemented by one or more network entities 105 (e.g., a network entity 105-*a*) and one or more UEs 115 (e.g., a UE 115-*a*), which may be examples of the corresponding devices as described herein with reference to FIG. 1. In the example of FIG. 2, the network entity 105-*a* may be an example of a CU 160, a DU 165, an RU 170, a base station 140, an IAB node 104, or one or more other network nodes as described herein with reference to FIG. 1. In some cases, the UE 115-*a* may determine an HPID associated with each CC of a set of CCs based on one or more parameters associated with a HARQ process and a respective HPID offset.

Some wireless communications systems may support multi-cell transmission (e.g., physical uplink shared channel (PUSCH)/physical downlink shared channel (PDSCH)) scheduling with a single control message (e.g., a single DCI). That is, a UE 115 (e.g., supporting intra-band carrier aggregation operations, inter-band carrier aggregation operations, or both) may be associated (e.g., configured) with a set of CCs (e.g., in a frequency range 1 (FR1), a frequency range 2 (FR2), or both) and a control message may schedule a transmission on each CC (e.g., one PDSCH/PUSCH per serving cell carrying separate transport blocks (TBs)). For example, a control message may schedule a first transmission on a first CC, a second transmission on a second CC, and a third transmission on a third CC (e.g., the control message may be optimized for 3 or more CCs). In some cases, a threshold (e.g., maximum) quantity of cells may be scheduled by the single control message (e.g., simultaneously).

In some cases, the control message may include a set of fields (e.g., uplink fields or downlink fields), where each field includes scheduling information for the respective transmissions associated with the set of CCs. For example, the set of fields may include one or more resource allocation fields, a modulation and coding scheme (MCS) field, or a redundancy version (RV) field, among other fields.

In some cases, one or more fields of the set of fields may include a common (e.g., joint) indication of scheduling information (e.g., resulting in low DCI overhead). That is, a control message may schedule respective transmissions on each CC of a set of CCs (e.g., one message per CC) and a field in the control message may include scheduling information that is the same for each transmission (e.g., each transmission may be associated with the same scheduling information regardless of a respective CC). For example, a control message may schedule a first transmission on a first CC, a second transmission on a second CC, and a third transmission on a third CC. Additionally, the control message may include a HARQ process number field indicating a common HPID (e.g., that is the same) for the first transmission, the second transmission, and the third transmission. That is, a UE 115 may communicate feedback for the first transmission, the second transmission, and the third transmission according to a HARQ process associated with the common HPID. However, indicating common scheduling information, such as a common HPID, may reduce scheduling flexibility (e.g., result in restrictive scheduling flexibility) and, in some cases, increase the latency of communications. For example, at a given time, a first set of HPIDs may be available (e.g., pending) for transmissions (e.g., an initial transmission or retransmissions) on the first CC, a second set of HPIDs may be available for transmissions on the second CC, and a third set of HPIDs may be available for transmissions on a third CC, such that a common HPID may not exist between the CCs (e.g., the first set of HPIDs, the second set of HPIDs, and the third set of HPIDs may be different or not aligned). In such cases, a network entity may delay transmissions on one or more of the first CC, the second CC, and the third CC to support a common HPID (e.g., to align HPIDs on different CCs), resulting in communication delays.

In some other cases, one or more fields of the set of fields may include separate (e.g., unique, per-CC) indications of scheduling (e.g., resulting in scheduling flexibility). That is, a control message may schedule respective transmissions on each CC of a set of CCs (e.g., one message per CC) and a field in the control message may include separate scheduling information for each transmission (e.g., different scheduling information per-CC). For example, a control message may schedule a first transmission on a first CC, a second transmission on a second CC, and a third transmission on a third CC. Additionally, the control message may include a HARQ process number field indicating a first HPID for the first CC, a second HPID for the second CC, and a third HPID for the third CC. That is, a UE 115 may transmit feedback for the first message according to a first HARQ process associated with the first HPID, feedback for the second message according to a second HARQ process associated with the second HPID, and feedback for the third message according to a third HARQ process associated with the third HPID. However, indicating separate scheduling information, such as a separate HPID per-CC, may increase overhead (e.g., lead to a large increase in DCI size). For example, a UE 115 may be configured for communications over 8 CCs (e.g., may receive a control message scheduling respective transmissions on each CC of the 8 CCs) and 16 HARQ processes may be supported by each CC. Additionally, an HPID indication for each CC may use 4 bits. Therefore, a network entity 105 may use 32 bits (e.g., 4 bits×8 CCs) in a control message (e.g., DCI bits) to provide the UE 115 with separate HPID indications for each CC.

Techniques described herein may support enhanced HARQ process number (e.g., HPID) indication for multi-cell scheduling. In some cases, a UE 115, such as a UE 115-a, may receive a control message 205-a from a network entity 105, such as a network entity 105-a, indicating one or more parameters associated with a HARQ process. For example, the one or more parameters may include a quantity of bits associated with an HPID offset field (e.g., a size of the HPID offset field). That is, the network entity 105-a may indicate (e.g., configure) the size of one or more HPID offset fields (e.g., to be transmitted) in a control message 205-b, where the control message 205-b includes scheduling information for respective transmissions on each CC 210 of a set of CCs 210.

In some cases, the quantity of bits may be based on the set (e.g., combination) of CCs 210 configured for the UE 115-a (e.g., to be scheduled with a PUSCH/PDSCH) by the network entity 105-a via the control message 205-b (e.g., for different new radio cell identities (nCIs)). For example, a first quantity of bits may be associated with a first combination (e.g., quantity) of CCs 210, including a CC 210-a, a CC 210-b, and a CC 210-c, and a second quantity of bits may be associated with a second combination of CCs 210, including the CC 210-a, the CC 210-b, the CC 210-c, and a CC 210-d. In some cases, the first quantity of bits may be larger than the second quantity of bits due to the first combination of CCs 210 containing a smaller quantity of CCs 210 than the second combination of CCs 210 (e.g., the network entity 105-a may configure a larger HPID offset field size, such as 3 bits, for a smaller number of cells and a smaller HPID offset field size, such as 1 bit, for a larger number of cells).

In some cases, the quantity of bits may be a common quantity of bits. That is, the quantity of bits may be independent of the set of CCs configured for the UE 115-a (e.g., to be scheduled with a PUSCH/PDSCH) by the network entity 105-a via the control message 205-b (e.g., for different nCIs). For example, a quantity of bits associated with the first combination of CCs 210, including the CC 210-a, the CC 210-b, and the CC 210-c, may be the same as a quantity of bits associated with the second combination of CCs 210, including the CC 210-a, the CC 210-b, the CC 210-c, and the CC 210-d.

Additionally, or alternatively, the one or more parameters may include a unit of HPID offset, which may be referred to as an HPID step, that may be used by the UE 115-a to determine a respective HPID for each CC 210 of a set of CCs configured (e.g., scheduled) for the UE 115-a. In some cases, the network entity 105-a may determine the HPID step based on a quantity of HARQ process supported by the set of CCs 210, the quantity of bits associated with the HPID offset field (e.g., a size of the HPID offset field), or both, as described with reference to FIG. 3.

In some cases, the UE 115-a may receive, from the network entity 105-a, the control message 205-b scheduling respective transmissions on each CC 210 of a set of CCs 210, including the CC 210-a, the CC 210-b, the CC 210-c, and the CC 210-d. That is, the control message 205-b may include a set of fields indicating scheduling information for the respective transmissions on each CC 210 of the set of CCs 210. Specifically, the control message 205-b may include a HARQ process number field indicating an HPID for each CC 210, as described with reference to FIG. 3. For example, the HARQ process number field in the control message 205-*b* may include a first set of bits (e.g., 4 bits) indicating a first HPID associated with the CC 210-*a* (e.g., a first cell) and one or more HPID offset fields (e.g., additional sets of bits) indicating a respective HPID offset for each additional CC 210, including the CC 210-*b*, the CC 210-*c*, and the CC 210-*d*. That is, the control message 205-*b* may include a first HPID offset field indicating a first HPID offset associated with the CC 210-*b*, a second HPID offset field indicating a second HPID offset associated with the CC 210-*c*, and a third HPID offset field indicating a third HPID offset associated with the CC 210-*d*. Each HPID offset field may contain the quantity of bits indicated in the control message 205-*a*.

Additionally, the UE 115-*a* may determine a respective HPID for the CC 210-*b*, the CC 210-*c*, and the CC 210-*d* (e.g., the additional CCs 210) based on the first HPID associated with the CC 210-*a*, the one or more parameters (e.g., the HPID step), and a respective HPID offset, as described with reference to FIG. 3. In some cases, the UE 115-*a* may transmit a set of feedback messages based on the determined HPIDs, where each feedback message is associated with a CC 210 (e.g., of the set of CCs 210) and is based on a respective HPID. For example, the UE 115-*a* may transmit a first feedback message associated with the CC 210-*a* according to a first HARQ process associated with the first HPID, a second feedback message associated with the CC 210-*b* according to a second HARQ process associated with the second HPID, a third feedback message associated with the CC 210-*c* according to a third HARQ process associated with the third HPID, and a fourth feedback message associated with the CC 210-*d* according to a fourth HARQ process associated with the fourth HPID. In some cases, one or more of the first HPID offset, the second HPID offset, or the third HPID offset may be the same. Additionally, or alternatively, one or more of the first HPID, the second HPID, the third HPID, or the fourth HPID may be the same.

While much of the present disclosure is described in the context of a network entity 105, such as the network entity 105-*a*, scheduling transmissions on a set of CCs 210, including the four CCs 210, via the control message 205-*b*, this is not to be regarded as a limitation of the present disclosure. Indeed, it is contemplated herein that the network entity 105-*a* may transmit the control message 205-*b* scheduling the CC 210-*a*, the CC 210-*b*, the CC 210-*c*, and the CC 210-*d*. In this regard, any quantity of CCs 210 may be considered with reference to the techniques described herein.

Figure 3:
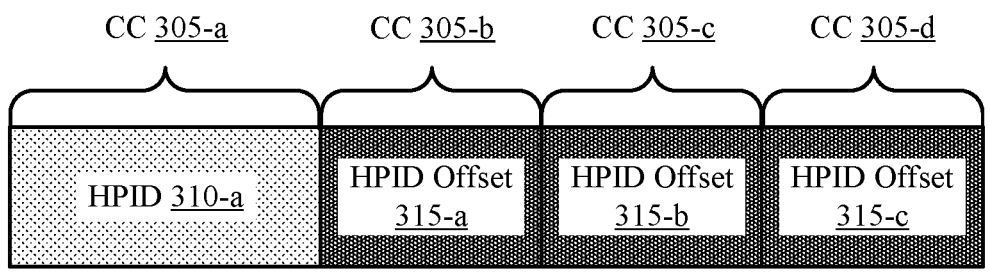
FIG. 3 illustrates an example of an HARQ process number indication that supports HARQ process number indication for multi-cell scheduling in accordance with one or more aspects of the present disclosure.

FIG. 3 illustrates an example of an HARQ process number indication 300 that supports HARQ process number indication for multi-cell scheduling in accordance with one or more aspects of the present disclosure. In some examples, the HARQ process number indication 300 may implement or be implemented by aspects of the wireless communications system 100, and the wireless communications system 200. For example, HARQ process number indication 300 may be implemented by one or more network entities 105 and one or more UEs 115, which may be examples of the corresponding devices as described herein with reference to FIG. 1. In some cases, a UE 115 may determine an HPID 310 associated with each CC 305 of a set of CCs 305 based on a HPID 310-*a* and one or more HPID offsets 315 included in the HARQ process number indication 300.

In some cases, a network entity 105 may transmit control signaling to a UE 115 including scheduling information for respective transmissions on each CC 305 of a set of CCs 305, including a CC 305-*a*, a CC 305-*b*, a CC 305-*c*, and a CC 305-*d*, as described with reference to FIG. 2. Additionally, the scheduling information may include a HARQ process number indication 300 (e.g., within an HARQ process number field) indicating respective HPIDs for each CC 305 of the set of CCs 305. For example, the HARQ process number indication 300 may include an indication of a HPID 310-*a* associated with the CC 305-*a* and a set of HPID offset fields indicating respective HPID offsets 315 (e.g., relative to the HPID 310-*a*) for each additional CC 305, including the CC 305-*b*, the CC 305-*c*, and the CC 305-*d*. That is, a first HPID offset field may indicate an HPID offset 315-*a* associated with the CC 305-*b*, a second HPID offset field may indicate an HPID offset 315-*b* associated with the CC 305-*c*, and a third HPID offset field may indicate an HPID offset 315-*c* associated with the CC 305-*d*.

In some examples, the UE 115 may determine a respective HPID for each additional CC 305 according to the following Equation 1:

$$\text{Cell}_n HPID = HPID \text{ Cell}_0 + (HPID \text{ Step} \times HPID \text{ Offset Cell}_n) \text{ \% } numHARQProcesses \quad (1)$$

where the parameter $\text{Cell}_n$ HPID may represent a given CC 305, the parameter HPID $\text{Cell}_0$ may represent an HPID 310 for a first scheduled CC, such as the HPID 310-*a* for the CC 305-*a*, the parameter HPID Step may represent a unit of HPID offset configured by the network entity 105 (as described with reference to FIG. 2), the parameter HPID Offset $\text{Cell}_n$ may represent an HPID offset 315 for the given CC 305, and the parameter numHARQProcesses may be based on a number of HARQ process supported by the scheduled set of CCs 305.

As such, the UE 115 may determine the HPIDs 310 for the CC 305-*a*, the CC 305-*b*, the CC 305-*c*, and the CC 305-*d* according to the following set of Equations:

$$CC\ 305\text{-}a\ HPID = HPID\ 310\text{-}a \quad (2)$$

$$CC\ 305\text{-}b\ HPID = $$
$$HPID\ 310\text{-}a + (HPID\ \text{Step} \times HPID\ \text{Offset}\ 315\text{-}a)\ \%\ numHARQProcesses$$

$$CC\ 305\text{-}c\ HPID = HPID\ 310\text{-}a + $$
$$(HPID\ \text{Step} \times HPID\ \text{Offset}\ 315\text{-}b)\ \%\ numHARQProcesses$$

$$CC\ 305\text{-}d\ HPID = HPID\ 310\text{-}a + $$
$$(HPID\ \text{Step} \times HPID\ \text{Offset}\ 315\text{-}c)\ \%\ numHARQProcesses$$

where the parameter HPID Step is configured by the network entity 105 and the parameter numHARQProcesses is the quantity of HARQ process supported by the CC 305-*a*, the CC 305-*b*, the CC 305-*c*, and the CC 305-*d*.

In some examples, the network entity 105 may configure the parameter HPID Step to be 1, such that the network entity 105 may select HPIDs 310 for the set of CCs 305 among clustered (e.g., sequential) HPIDs 310. In some other examples, the network entity may configure the parameter HPID Step according to following Equation 3:

$$\text{Step} = \frac{numHARQProcesses}{pow(2, HPID\ \text{Offset Field Size})} \quad (3)$$

where the parameter HPID Offset Field Size may be based on the quantity of bits associated with each HPID offset field and may be configured by the network entity 105, as described with reference to FIG. 2. In such cases, the network entity 105 may select HPIDs 310 for the set of CCs 305 among scattered HPIDs 310.

Figure 4:
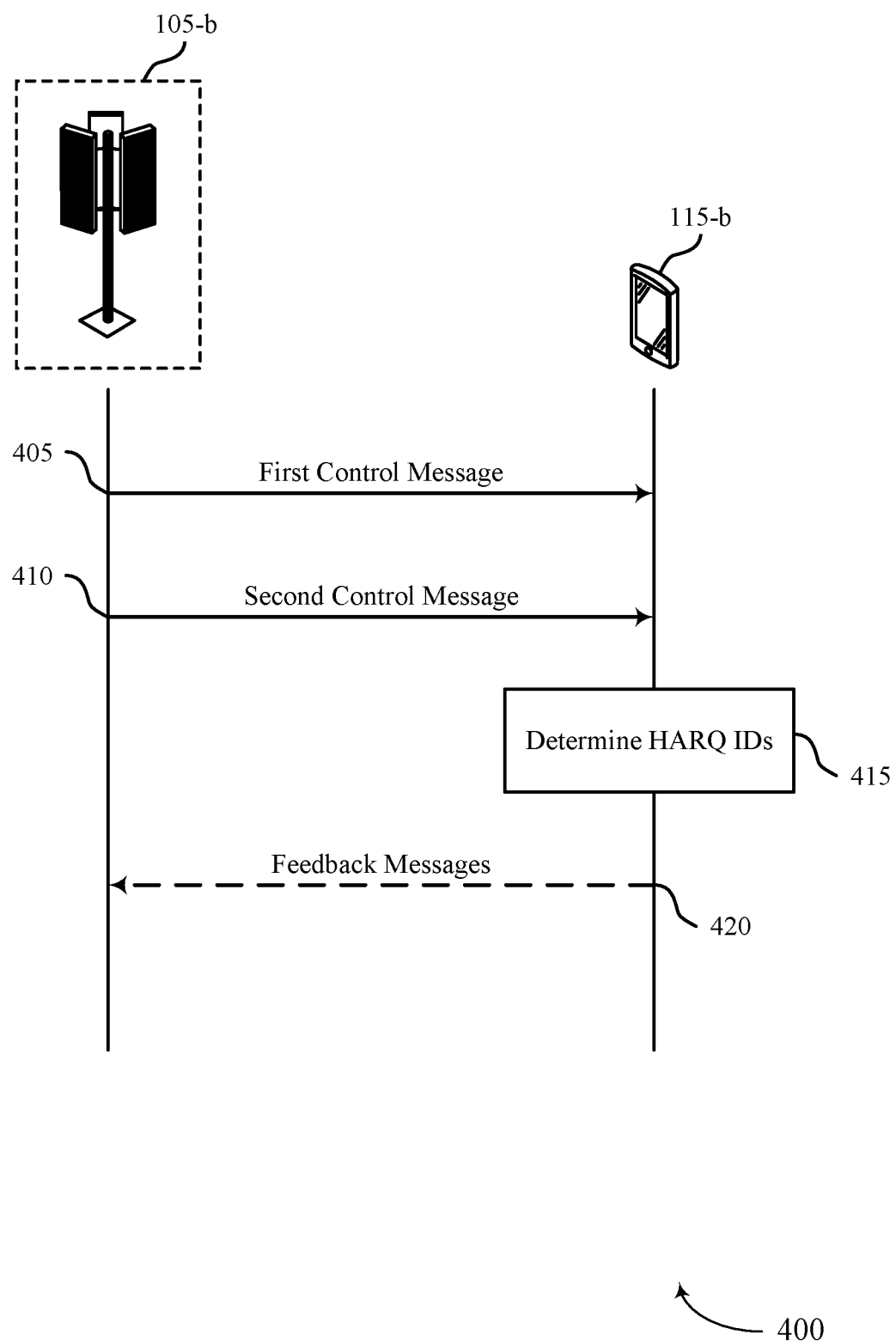
FIG. 4 illustrates an example of a process flow that supports HARQ process number indication for multi-cell scheduling in accordance with one or more aspects of the present disclosure.

FIG. 4 illustrates an example of a process flow 400 that supports HARQ process number indication for multi-cell scheduling in accordance with one or more aspects of the present disclosure. In some examples, the process flow 400 may implement or be implemented by aspects of the wireless communications system 100, the wireless communications system 200, and the HARQ process number indication 300. For example, the process flow 400 may be implemented by one or more network entities 105 (e.g., a network entity 105-*b*) and one or more UEs 115 (e.g., a UE 115-*b*), which may be examples of the corresponding devices as described herein with reference to FIG. 1. In the example of FIG. 4, the network entity 105-*b* may be an example of a CU 160, a DU 165, an RU 170, a base station 140, an IAB node 104, or one or more other network nodes as described herein with reference to FIG. 1. In some cases, the UE 115-*b* may determine an HPID associated with each CC of a set of CCs based on one or more parameters associated with a HARQ process and a respective HPID offset.

At 405, the UE 115-*b* may receive, from the network entity 105-*b*, first control signaling indicating one or more parameters associated with a HARQ process. In some cases, the one or more parameters may include an indication of a quantity of bits associated with an HPID offset field (e.g., a size of an HPID offset field). In some cases, the quantity of bits may be based on the set of CCs (e.g., a size of the HPID offset field may be different for different cell combinations configured for multi-cell scheduling). That is, a first quantity of bits may be associated with a first combination of CCs and a second quantity of bits may be associated with a second combination of CCs. For example, the first combination of CCs may include a small quantity of CCs (e.g., below a threshold quantity of CCs) and the first quantity of bits may be 3 (e.g., each HPID offset field is 3 bits). In another example, the second combination of CCs may include a large quantity of CCs (e.g., above a threshold quantity of CCs) and the second quantity of bits may be 1 bit (e.g., each HPID offset field is 1 bit). In some other cases, the quantity of bits may be a common quantity of bits independent of the combination of CCs (e.g., a size of the HPID offset field may be common for all cell combinations configured for multi-cell scheduling). That is, a quantity of bits associated with a first combination of CCs may be the same as a quantity of bits associated with a second combination of CCs.

In some cases, the one or more parameters may include a unit of HPID offset (e.g., an HPID step size). In some cases, the network entity 105-*b* may determine the unit of HPID offset based on an HPID field size (e.g., the quantity of bits associated with the HPID offset field), a quantity of HARQ processes supported by the set of CCs, or both. In some cases, the unit of HPID offset may be 1.

At 410, the UE 115-*b* may receive, from the network entity 105-*b*, second control signaling indicating scheduling information associated with the set of CCs, where the scheduling information includes one or more HPID offsets. That is, the second control signaling may include one or more HPID offset fields (e.g., based on the quantity of bits indicated in the first control signaling) and each HPID offset field may include an HPID offset associated with a respective CC (e.g., each HPID offset field may be associated with a respective CC). Additionally, the second control signaling may include an indication of a first HPID associated with a first CC. For example, the first control signaling may include an indication of the first HPID associated with a first CC, a first HPID offset associated with a second CC, a second HPID offset associated with a third CC, and a third HPID offset associated with a fourth CC.

At 415, the UE 115-*b* may determine an HPID associated with each CC of the set of CCs based on the one or more parameters, the first HPID associated with the first CC, and a respective HPID offset from the one or more HPID offsets. For example, the UE 115-*b* may determine a second HPID associated with the second CC of the set of CCs based on the first HPID offset associated with the second CC, the one or more parameters (e.g., the HPID step size), and the first HPID associated with the first CC (e.g., indicated in the first control signaling).

In some cases, at 420, the UE 115-*b* may transmit a set of feedback messages based on the determined HPID offsets, where each feedback message is associated with a CC (e.g., of the set of CCs) and is based on a respective HPID. For example, the UE 115-*b* may transmit a first feedback message associated with the first CC and based on the first HPID, a second feedback message associated with the second CC and based on the second HPID, a third feedback message associated with the third CC and based on the third HPID, and a fourth feedback message associated with the fourth CC and based on the fourth HPID.

Figure 5:
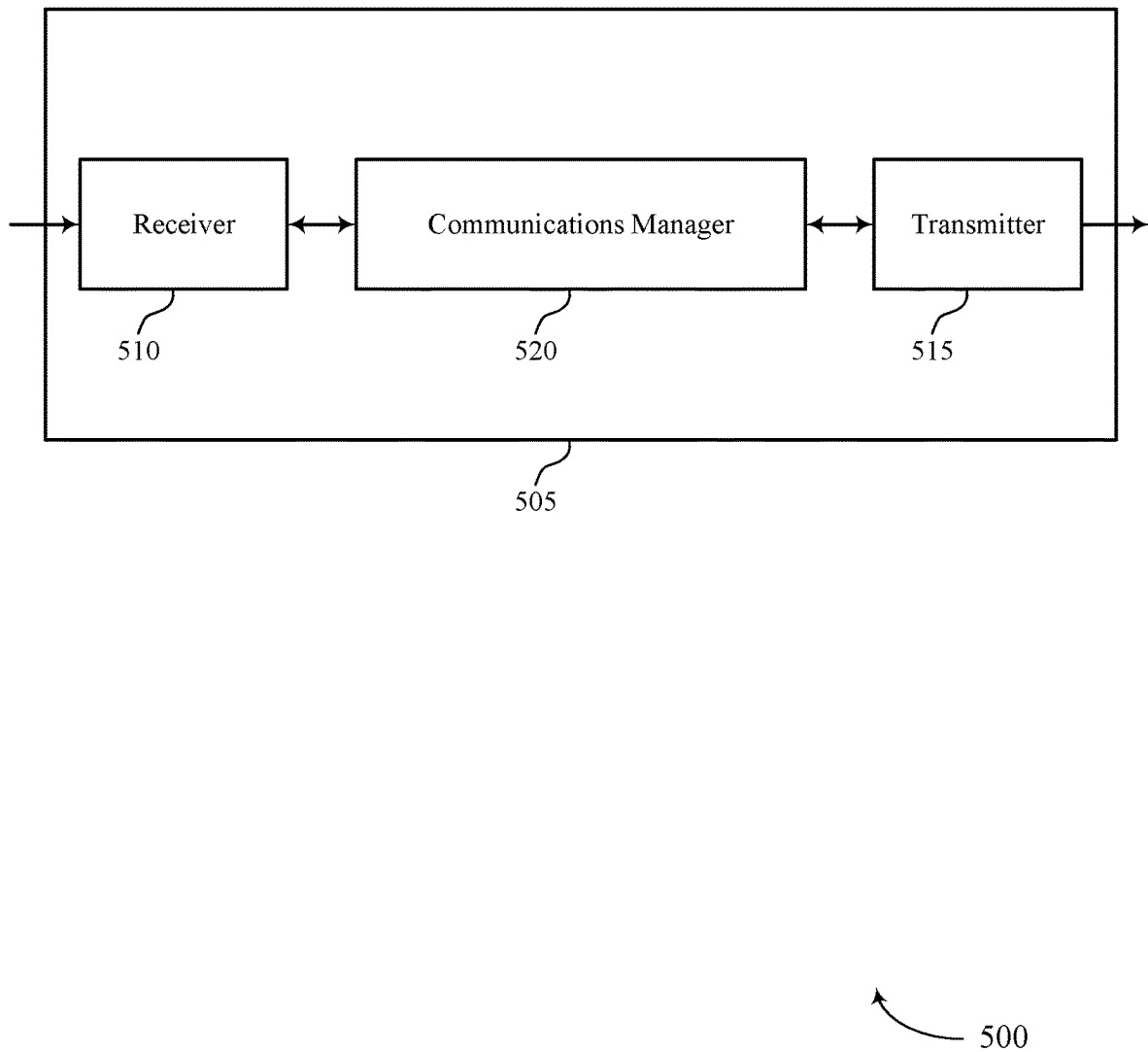
FIGS. 5 and 6 show block diagrams of devices that support HARQ process number indication for multi-cell scheduling in accordance with one or more aspects of the present disclosure.

FIG. 5 shows a block diagram 500 of a device 505 that supports HARQ process number indication for multi-cell scheduling in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to HARQ process number indication for multi-cell scheduling). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to HARQ process number indication for multi-cell scheduling). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of HARQ process number indication for multi-cell scheduling as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for receiving first control signaling including one or more parameters associated with a hybrid automatic repeated request (HARQ) process. The communications manager 520 may be configured as or otherwise support a means for receiving second control signaling indicating scheduling information associated with a set of multiple CCs, where the scheduling information includes one or more HPID offsets. The communications manager 520 may be configured as or otherwise support a means for determining a HPID associated with each CC of the set of multiple CCs based on the one or more parameters in the first control signaling and a respective HPID offset from the one or more HPID offsets in the second control signaling.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for enhanced HPID indication which may result in a balance between scheduling flexibility and control signaling overhead which may further result in reduced processing, reduced power consumption, and more efficient utilization of communication resources, among other advantages.

Figure 6:
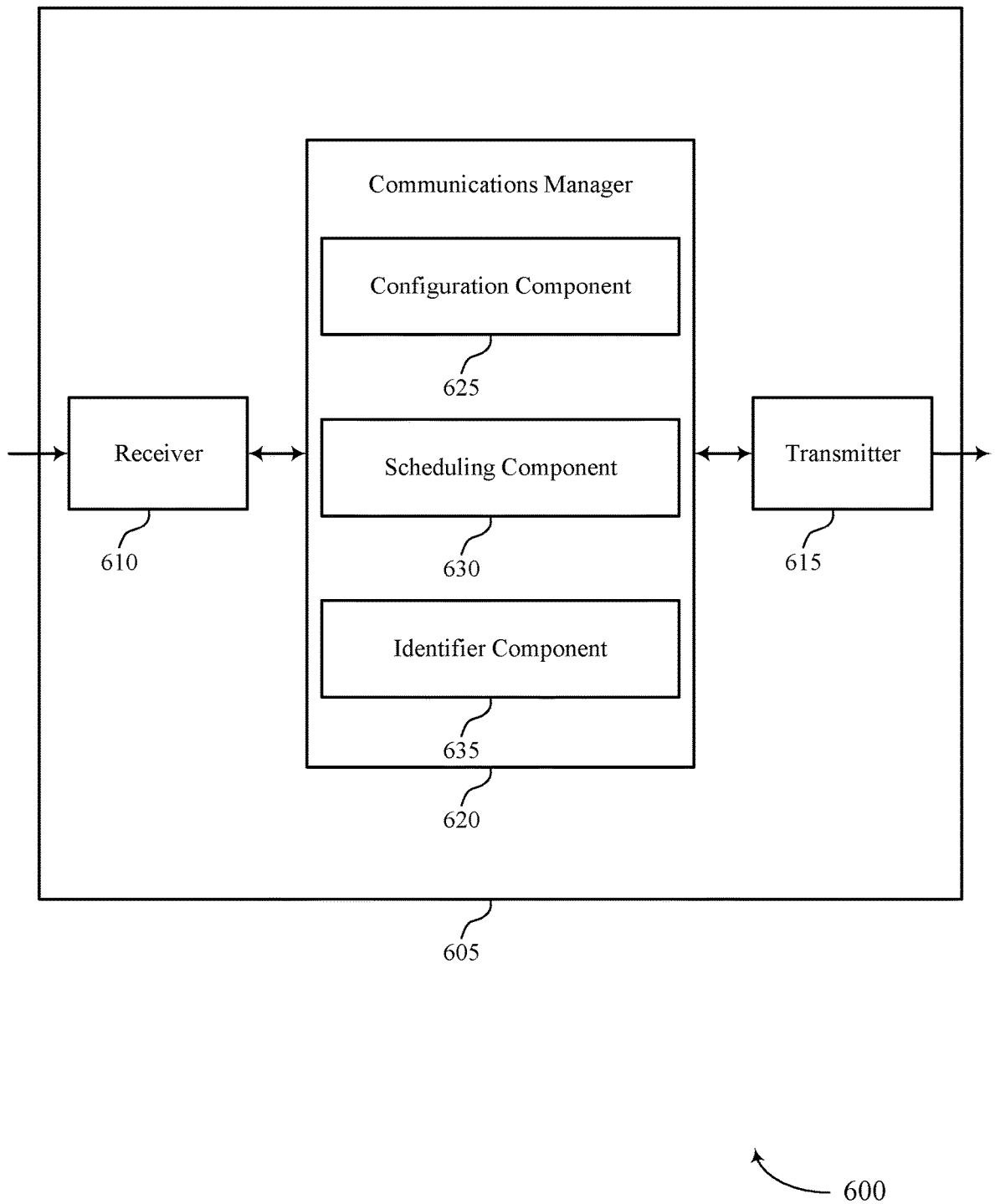

FIG. 6 shows a block diagram 600 of a device 605 that supports HARQ process number indication for multi-cell scheduling in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to HARQ process number indication for multi-cell scheduling). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to HARQ process number indication for multi-cell scheduling). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of HARQ process number indication for multi-cell scheduling as described herein. For example, the communications manager 620 may include a configuration component 625, a scheduling component 630, an identifier component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The configuration component 625 may be configured as or otherwise support a means for receiving first control signaling including one or more parameters associated with a hybrid automatic repeated request (HARQ) process. The scheduling component 630 may be configured as or otherwise support a means for receiving second control signaling indicating scheduling information associated with a set of multiple CCs, where the scheduling information includes one or more HPID offsets. The identifier component 635 may be configured as or otherwise support a means for determining a HPID associated with each CC of the set of multiple CCs based on the one or more parameters in the first control signaling and a respective HPID offset from the one or more HPID offsets in the second control signaling.

Figure 7:
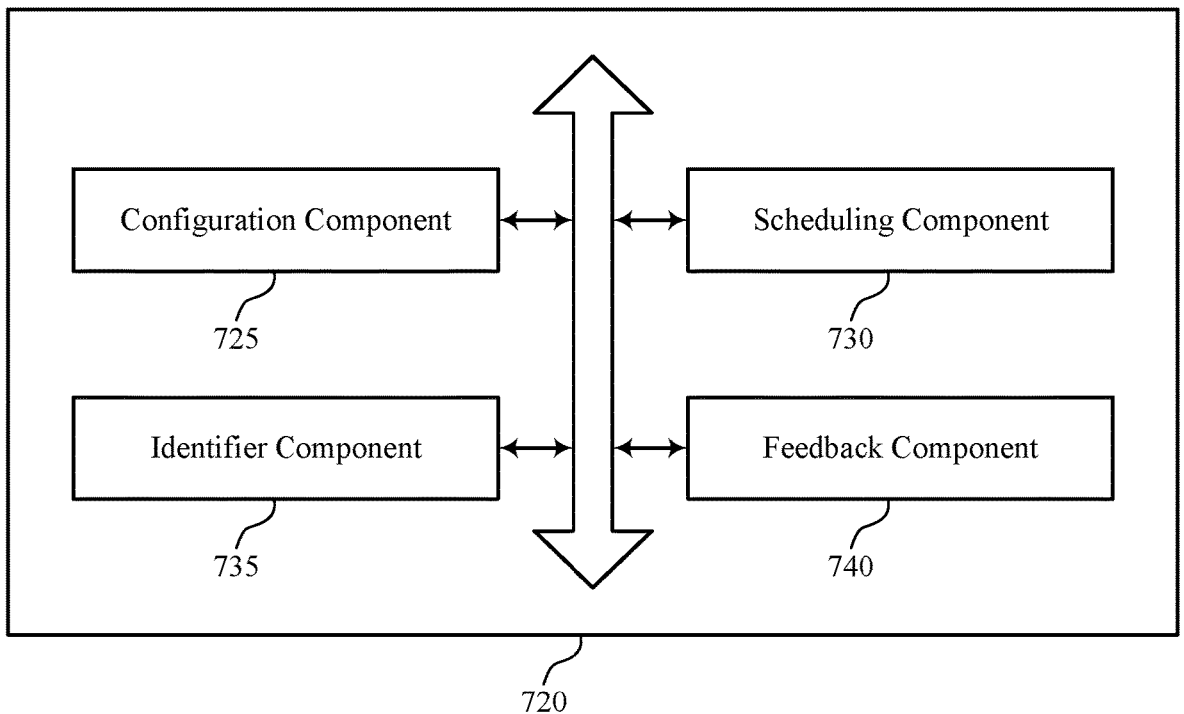
FIG. 7 shows a block diagram of a communications manager that supports HARQ process number indication for multi-cell scheduling in accordance with one or more aspects of the present disclosure.

FIG. 7 shows a block diagram 700 of a communications manager 720 that supports HARQ process number indication for multi-cell scheduling in accordance with one or more aspects of the present disclosure. The communications manager 720 may be an example of aspects of a communications manager 520, a communications manager 620, or both, as described herein. The communications manager 720, or various components thereof, may be an example of means for performing various aspects of HARQ process number indication for multi-cell scheduling as described herein. For example, the communications manager 720 may include a configuration component 725, a scheduling component 730, an identifier component 735, a feedback component 740, or any combination thereof. Each of these components may communicate, directly or indirectly, with one another (e.g., via one or more buses).

The communications manager 720 may support wireless communications at a UE in accordance with examples as disclosed herein. The configuration component 725 may be configured as or otherwise support a means for receiving first control signaling including one or more parameters associated with a hybrid automatic repeated request (HARQ) process. The scheduling component 730 may be configured as or otherwise support a means for receiving second control signaling indicating scheduling information associated with a set of multiple CCs, where the scheduling information includes one or more HPID offsets. The identifier component 735 may be configured as or otherwise support a means for determining a HPID associated with each CC of the set of multiple CCs based on the one or more parameters in the first control signaling and a respective HPID offset from the one or more HPID offsets in the second control signaling.

In some examples, to support receiving the second control signaling, the identifier component 735 may be configured as or otherwise support a means for receiving an indication of a first HPID associated with a first CC of the set of multiple CCs, where the scheduling information includes the first HPID, and where determining the HPID associated with each CC of the set of multiple CCs is based on the first HPID.

In some examples, to support determining the HPID associated with each CC of the set of multiple CCs, the identifier component 735 may be configured as or otherwise support a means for determining a second HPID associated with a second CC of the set of multiple CCs based on the first HPID, the one or more parameters, and a first HPID offset of the one or more HPID offsets, where the first HPID offset is associated with the second CC.

In some examples, to support receiving the first control signaling, the configuration component 725 may be configured as or otherwise support a means for receiving an indication of a quantity of bits associated with a HPID offset field, where the second control signaling includes one or more HPID offset fields, and where the one or more parameters includes the quantity of bits.

In some examples, each HPID offset field of the one or more HPID offset fields includes a HPID offset of the one or more HPID offsets. In some examples, each HPID offset of the one or more HPID offsets is associated with a CC of the set of multiple CCs.

In some examples, the quantity of bits associated with the HPID offset field is based on the set of multiple CCs.

In some examples, the quantity of bits associated with the HPID offset field is a common quantity of bits.

In some examples, to support receiving the first control signaling, the configuration component 725 may be configured as or otherwise support a means for receiving an indication of a unit of HPID offset, where the one or more parameters includes the unit of HPID offset.

In some examples, the feedback component 740 may be configured as or otherwise support a means for transmitting a set of multiple feedback messages based on the determining, where each feedback message of the set of multiple feedback messages is associated with a CC of the set of multiple CCs and is based on a respective HPID.

Figure 8:
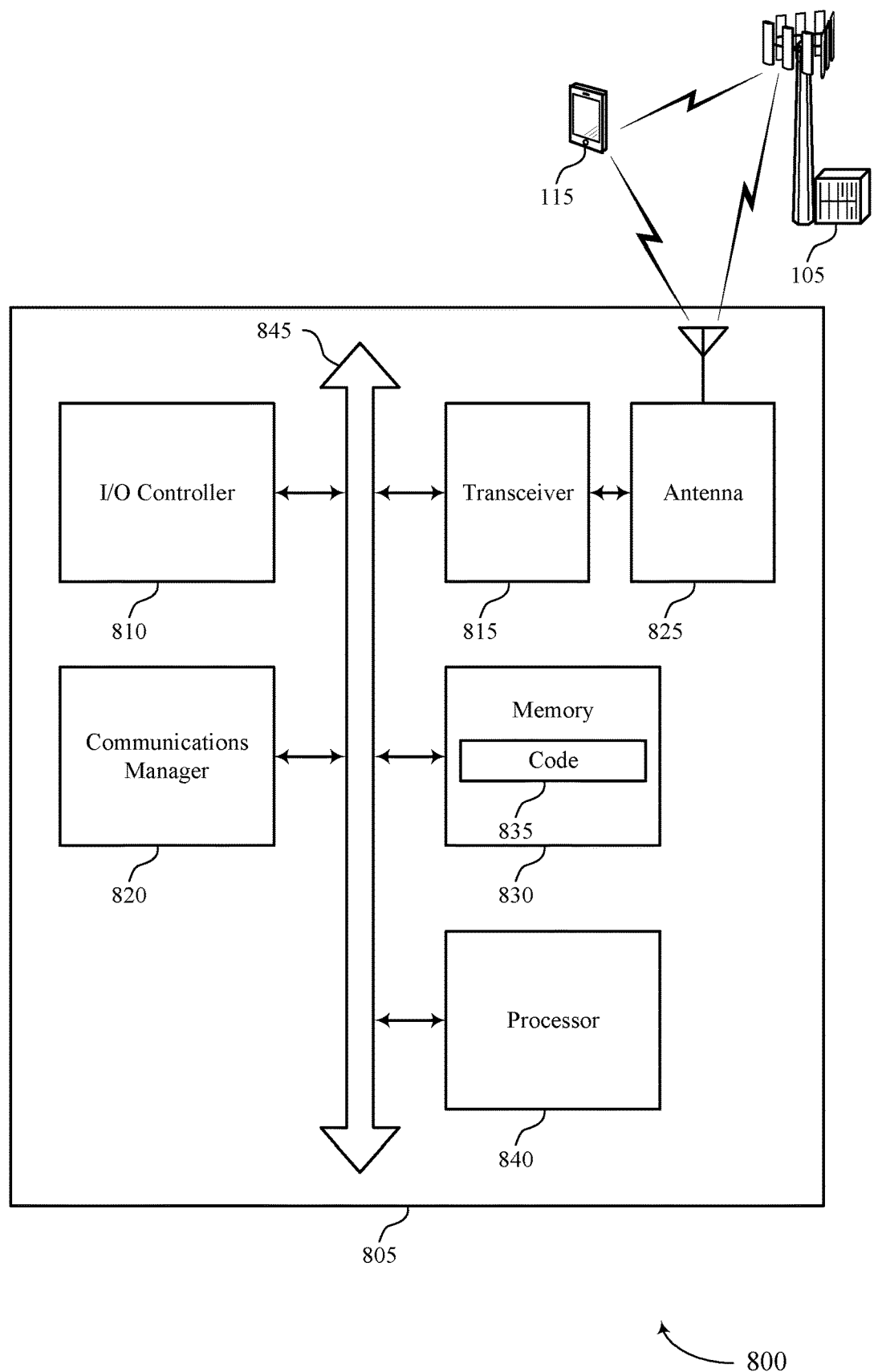
FIG. 8 shows a diagram of a system including a device that supports HARQ process number indication for multi-cell scheduling in accordance with one or more aspects of the present disclosure.

FIG. 8 shows a diagram of a system 800 including a device 805 that supports HARQ process number indication for multi-cell scheduling in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed)

to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting HARQ process number indication for multi-cell scheduling). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving first control signaling including one or more parameters associated with a hybrid automatic repeated request (HARQ) process. The communications manager 820 may be configured as or otherwise support a means for receiving second control signaling indicating scheduling information associated with a set of multiple CCs, where the scheduling information includes one or more HPID offsets. The communications manager 820 may be configured as or otherwise support a means for determining a HPID associated with each CC of the set of multiple CCs based on the one or more parameters in the first control signaling and a respective HPID offset from the one or more HPID offsets in the second control signaling.

By including or configuring the communications manager 820 in accordance with examples as described herein, the device 805 may support techniques for enhanced HPID indication which may result in a balance between scheduling flexibility and control signaling overhead which may further result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of HARQ process number indication for multi-cell scheduling as described herein, or the processor 840 and the memory 830 may be otherwise configured to perform or support such operations.

Figure 9:
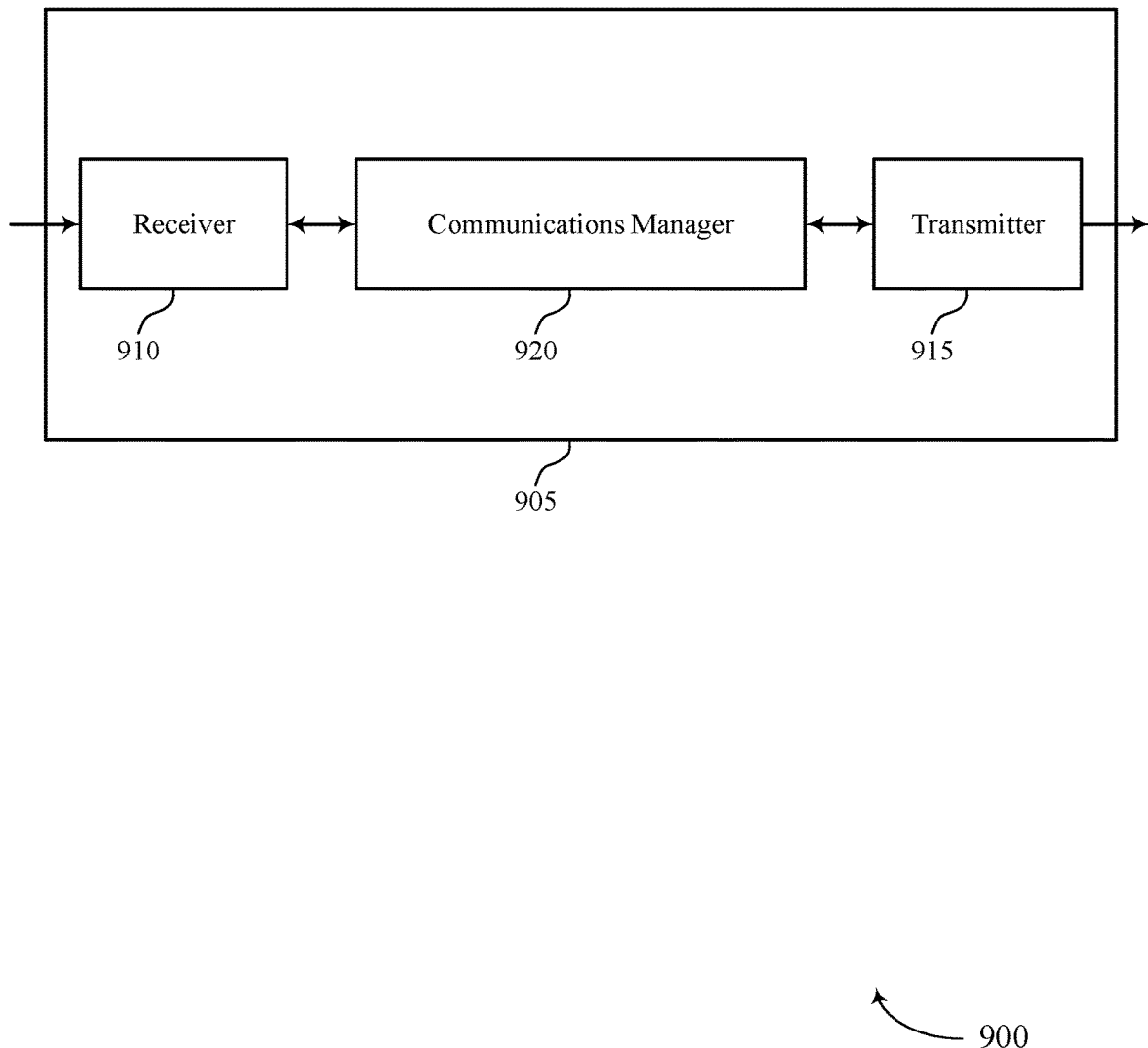
FIGS. 9 and 10 show block diagrams of devices that support HARQ process number indication for multi-cell scheduling in accordance with one or more aspects of the present disclosure.

FIG. 9 shows a block diagram 900 of a device 905 that supports HARQ process number indication for multi-cell scheduling in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of HARQ process number indication for multi-cell scheduling as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

For example, the communications manager 920 may be configured as or otherwise support a means for transmitting first control signaling including one or more parameters associated with a hybrid automatic repeated request (HARQ) process. The communications manager 920 may be configured as or otherwise support a means for transmitting second control signaling indicating scheduling information associated with a set of multiple CCs, where the scheduling information includes one or more HPID offsets.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for enhanced HPID indication which may result in a balance between scheduling flexibility and control signaling overhead which may further result in reduced processing, reduced power consumption, and more efficient utilization of communication resources, among other advantages.

Figure 10:
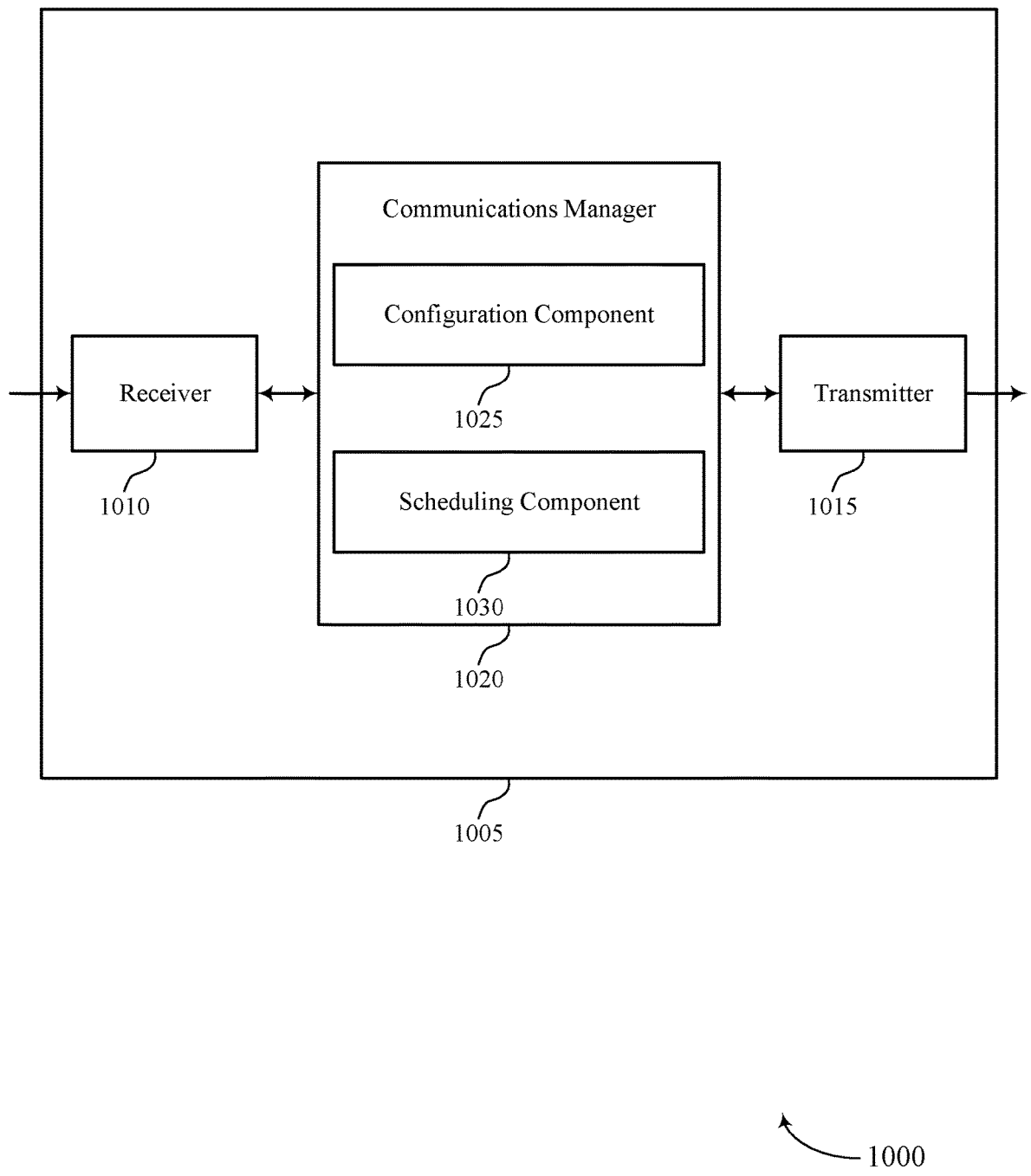

FIG. 10 shows a block diagram 1000 of a device 1005 that supports HARQ process number indication for multi-cell scheduling in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of HARQ process number indication for multi-cell scheduling as described herein. For example, the communications manager 1020 may include a configuration component 1025 a scheduling component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The configuration component 1025 may be configured as or otherwise support a means for transmitting first control signaling including one or more parameters associated with a hybrid automatic repeated request (HARQ) process. The scheduling component 1030 may be configured as or otherwise support a means for transmitting second control signaling indicating scheduling information associated with a set of multiple CCs, where the scheduling information includes one or more HPID offsets.

Figure 11:
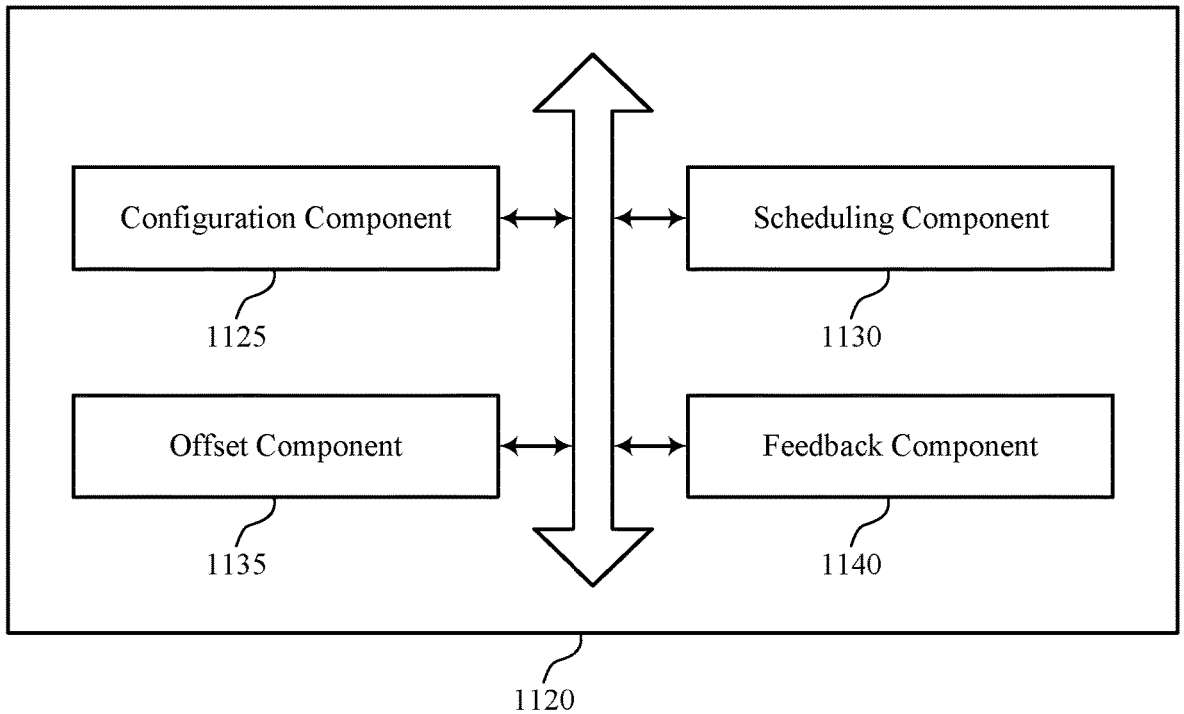
FIG. 11 shows a block diagram of a communications manager that supports HARQ process number indication for multi-cell scheduling in accordance with one or more aspects of the present disclosure.

FIG. 11 shows a block diagram 1100 of a communications manager 1120 that supports HARQ process number indication for multi-cell scheduling in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of HARQ process number indication for multi-cell scheduling as described herein. For example, the communications manager 1120 may include a configuration component 1125, a scheduling component 1130, an offset component 1135, a feedback component 1140, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The configuration component 1125 may be configured as or otherwise support a means for transmitting first control signaling including one or more parameters associated with a hybrid automatic repeated request (HARQ) process. The scheduling component 1130 may be configured as or otherwise support a means for transmitting second control signaling indicating scheduling information associated with a set of multiple CCs, where the scheduling information includes one or more HPID offsets.

In some examples, to support transmitting the second control signaling, the scheduling component 1130 may be configured as or otherwise support a means for transmitting an indication of a first HPID associated with a first CC of the set of multiple CCs, where the scheduling information includes the first HPID.

In some examples, to support transmitting the first control signaling, the configuration component 1125 may be configured as or otherwise support a means for transmitting an indication of a quantity of bits associated with a HPID offset field, where the second control signaling includes one or more HPID offset fields, and where the one or more parameters includes the quantity of bits.

In some examples, each HPID offset field of the one or more HPID offset fields includes a HPID offset of the one or more HPID offsets. In some examples, each HPID offset of the one or more HPID offsets is associated with a CC of the set of multiple CCs.

In some examples, the quantity of bits associated with the HPID offset field is based on the set of multiple CCs.

In some examples, the quantity of bits associated with the HPID offset field is a common quantity of bits.

In some examples, to support transmitting the first control signaling, the offset component 1135 may be configured as or otherwise support a means for transmitting an indication of a unit of HPID offset, where the one or more parameters includes the unit of HPID offset.

In some examples, the offset component 1135 may be configured as or otherwise support a means for determining the unit of HPID offset based on a HPID field size, a quantity of HARQ processes, or both.

In some examples, the offset component 1135 may be configured as or otherwise support a means for determining the unit of HPID offset to be 1.

In some examples, the feedback component 1140 may be configured as or otherwise support a means for receiving a set of multiple feedback messages, where each feedback message of the set of multiple feedback messages is associated with a CC of the set of multiple CCs and is based on a respective HPID.

Figure 12:
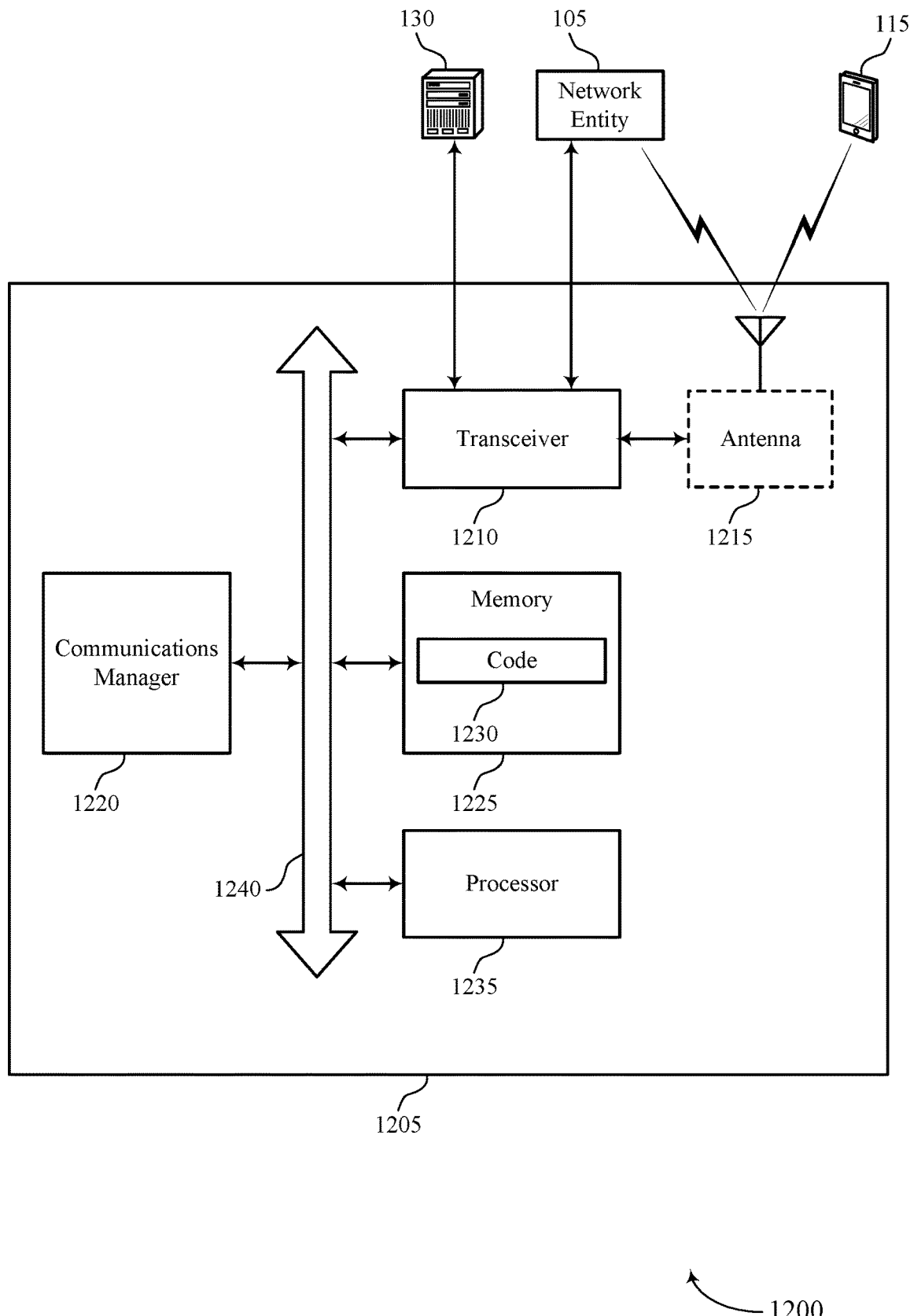
FIG. 12 shows a diagram of a system including a device that supports HARQ process number indication for multi-cell scheduling in accordance with one or more aspects of the present disclosure.

FIG. 12 shows a diagram of a system 1200 including a device 1205 that supports HARQ process number indication for multi-cell scheduling in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting HARQ process number indication for multi-cell scheduling). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

For example, the communications manager 1220 may be configured as or otherwise support a means for transmitting first control signaling including one or more parameters associated with a hybrid automatic repeated request (HARQ) process. The communications manager 1220 may be configured as or otherwise support a means for transmitting second control signaling indicating scheduling information associated with a set of multiple CCs, where the scheduling information includes one or more HPID offsets.

By including or configuring the communications manager 1220 in accordance with examples as described herein, the device 1205 may support techniques for enhanced HPID indication which may result in a balance between scheduling flexibility and control signaling overhead which may further result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of HARQ process number indication for multi-cell scheduling as described herein, or the processor 1235 and the memory 1225 may be otherwise configured to perform or support such operations.

Figure 13:
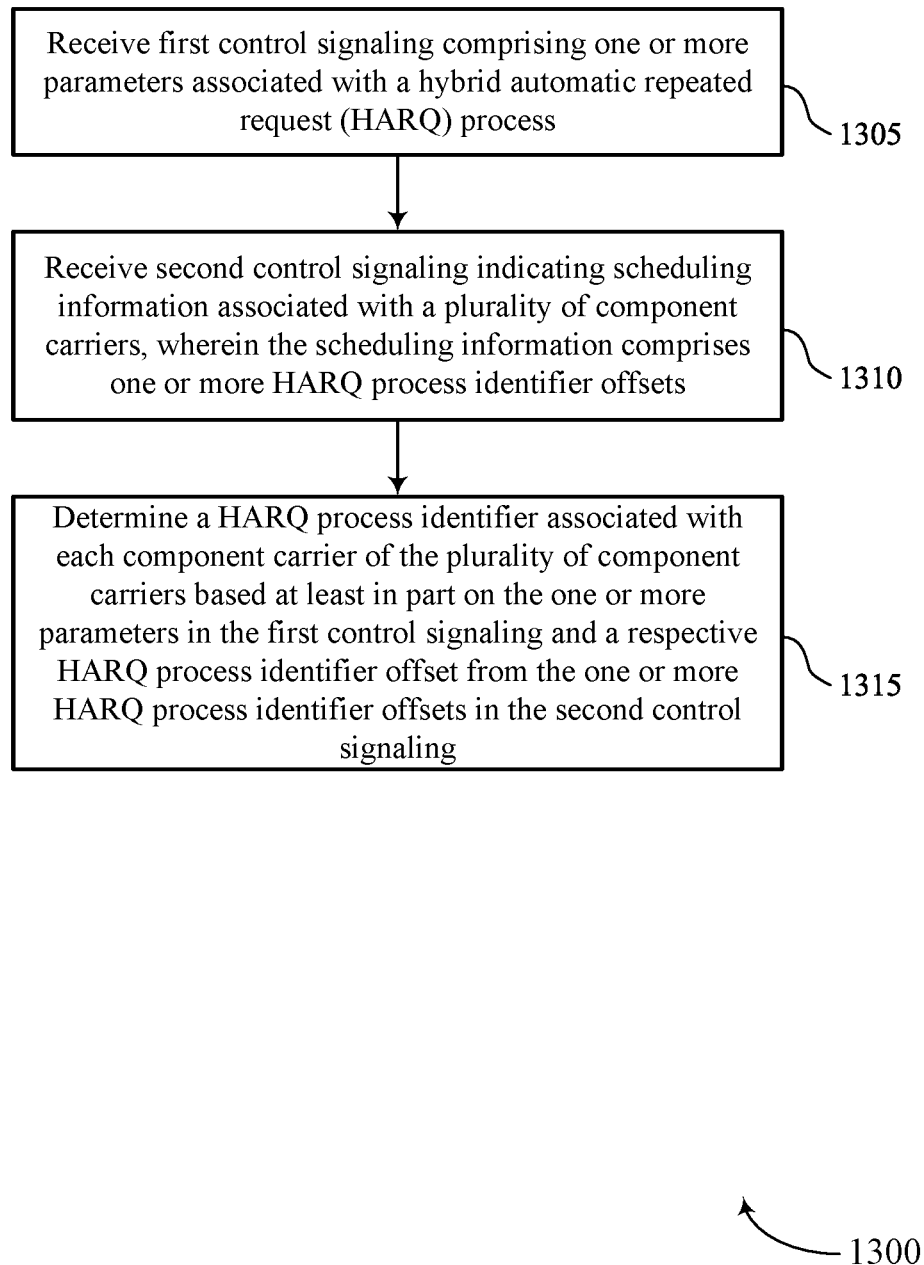
FIGS. 13 and 14 show flowcharts illustrating methods that support HARQ process number indication for multi-cell scheduling in accordance with one or more aspects of the present disclosure.

FIG. 13 shows a flowchart illustrating a method 1300 that supports HARQ process number indication for multi-cell scheduling in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving first control signaling including one or more parameters associated with a hybrid automatic repeated request (HARQ) process. The operations of 1305 may be performed in accordance with examples as disclosed herein. In some examples, aspects of the operations of 1305 may be performed by a configuration component 725 as described with reference to FIG. 7.

At 1310, the method may include receiving second control signaling indicating scheduling information associated with a set of multiple CCs, where the scheduling information includes one or more HPID offsets. The operations of 1310 may be performed in accordance with examples as disclosed herein. In some examples, aspects of the operations of 1310 may be performed by a scheduling component 730 as described with reference to FIG. 7.

At 1315, the method may include determining a HPID associated with each CC of the set of multiple CCs based on the one or more parameters in the first control signaling and a respective HPID offset from the one or more HPID offsets in the second control signaling. The operations of 1315 may be performed in accordance with examples as disclosed herein. In some examples, aspects of the operations of 1315 may be performed by an identifier component 735 as described with reference to FIG. 7.

Figure 14:
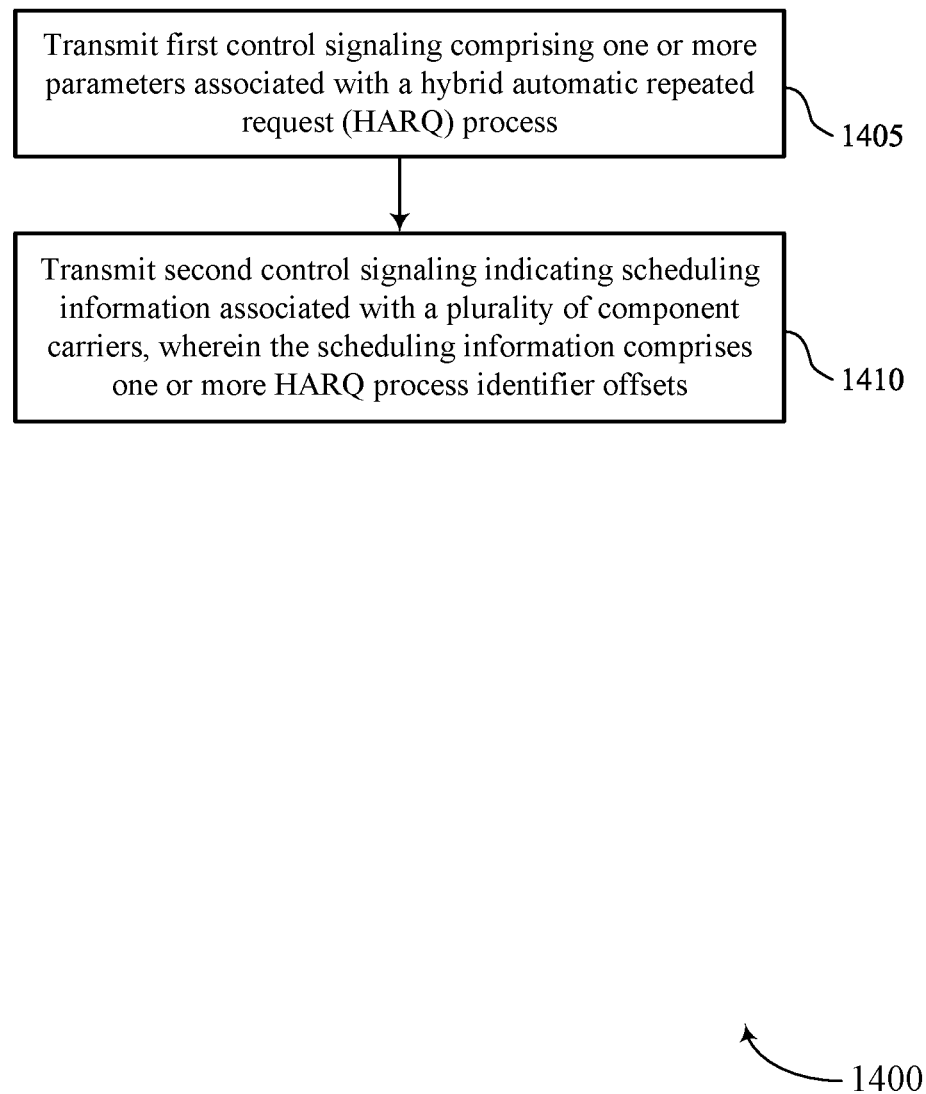

FIG. 14 shows a flowchart illustrating a method 1400 that supports HARQ process number indication for multi-cell scheduling in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include transmitting first control signaling including one or more parameters associated with a hybrid automatic repeated request (HARQ) process. The operations of 1405 may be performed in accordance with examples as disclosed herein. In some examples, aspects of the operations of 1405 may be performed by a configuration component 1125 as described with reference to FIG. 11.

At 1410, the method may include transmitting second control signaling indicating scheduling information associated with a set of multiple CCs, where the scheduling information includes one or more HPID offsets. The operations of 1410 may be performed in accordance with examples as disclosed herein. In some examples, aspects of the operations of 1410 may be performed by a scheduling component 1130 as described with reference to FIG. 11.

The following provides an overview of aspects of the present disclosure:

Aspect 1: A method for wireless communications at a UE, comprising: receiving first control signaling comprising one or more parameters associated with a hybrid automatic repeated request (HARQ) process; receiving second control signaling indicating scheduling information associated with a plurality of component carriers, wherein the scheduling information comprises one or more HARQ process identifier offsets; and determining a HARQ process identifier associated with each component carrier of the plurality of component carriers based at least in part on the one or more parameters in the first control signaling and a respective HARQ process identifier offset from the one or more HARQ process identifier offsets in the second control signaling.

Aspect 2: The method of aspect 1, wherein receiving the second control signaling comprises: receiving an indication of a first HARQ process identifier associated with a first component carrier of the plurality of component carriers, wherein the scheduling information comprises the first HARQ process identifier, and wherein determining the HARQ process identifier associated with each component carrier of the plurality of component carriers is based at least in part on the first HARQ process identifier.

Aspect 3: The method of aspect 2, wherein determining the HARQ process identifier associated with each component carrier of the plurality of component carriers comprises: determining a second HARQ process identifier associated with a second component carrier of the plurality of component carriers based at least in part on the first HARQ process identifier, the one or more parameters, and a first HARQ process identifier offset of the one or more HARQ process identifier offsets, wherein the first HARQ process identifier offset is associated with the second component carrier.

Aspect 4: The method of any of aspects 1 through 3, wherein receiving the first control signaling comprises: receiving an indication of a quantity of bits associated with a HARQ process identifier offset field, wherein the second control signaling comprises one or more HARQ process identifier offset fields, and wherein the one or more parameters comprises the quantity of bits.

Aspect 5: The method of aspect 4, wherein each HARQ process identifier offset field of the one or more HARQ process identifier offset fields comprises a HARQ process identifier offset of the one or more HARQ process identifier offsets, and each HARQ process identifier offset of the one or more HARQ process identifier offsets is associated with a component carrier of the plurality of component carriers.

Aspect 6: The method of any of aspects 4 through 5, wherein the quantity of bits associated with the HARQ process identifier offset field is based at least in part on the plurality of component carriers.

Aspect 7: The method of any of aspects 4 through 5, wherein the quantity of bits associated with the HARQ process identifier offset field is a common quantity of bits.

Aspect 8: The method of any of aspects 1 through 7, wherein receiving the first control signaling comprises: receiving an indication of a unit of HARQ process identifier offset, wherein the one or more parameters comprises the unit of HARQ process identifier offset.

Aspect 9: The method of any of aspects 1 through 8, further comprising: transmitting a plurality of feedback messages based at least in part on the determining, wherein each feedback message of the plurality of feedback messages is associated with a component carrier of the plurality of component carriers and is based at least in part on a respective HARQ process identifier.

Aspect 10: A method for wireless communications at a network entity comprising: transmitting first control signaling comprising one or more parameters associated with a hybrid automatic repeated request (HARQ) process; and transmitting second control signaling indicating scheduling information associated with a plurality of component carriers, wherein the scheduling information comprises one or more HARQ process identifier offsets.

Aspect 11: The method of aspect 10, wherein transmitting the second control signaling comprises: transmitting an indication of a first HARQ process identifier associated with a first component carrier of the plurality of component carriers, wherein the scheduling information comprises the first HARQ process identifier.

Aspect 12: The method of any of aspects 10 through 11, transmitting the first control signaling comprises: transmitting an indication of a quantity of bits associated with a HARQ process identifier offset field, wherein the second control signaling comprises one or more HARQ process identifier offset fields, and wherein the one or more parameters comprises the quantity of bits.

Aspect 13: The method of aspect 12, wherein each HARQ process identifier offset field of the one or more HARQ process identifier offset fields comprises a HARQ process identifier offset of the one or more HARQ process identifier offsets, and each HARQ process identifier offset of the one or more HARQ process identifier offsets is associated with a component carrier of the plurality of component carriers.

Aspect 14: The method of any of aspects 12 through 13, wherein the quantity of bits associated with the HARQ process identifier offset field is based at least in part on the plurality of component carriers.

Aspect 15: The method of any of aspects 12 through 13, wherein the quantity of bits associated with the HARQ process identifier offset field is a common quantity of bits.

Aspect 16: The method of any of aspects 10 through 15, wherein transmitting the first control signaling comprises: transmitting an indication of a unit of HARQ process identifier offset, wherein the one or more parameters comprises the unit of HARQ process identifier offset.

Aspect 17: The method of aspect 16, further comprising: determining the unit of HARQ process identifier offset based at least in part on a HARQ process identifier field size, a quantity of HARQ processes, or both.

Aspect 18: The method of any of aspects 16 through 17, further comprising: determining the unit of HARQ process identifier offset to be 1.

Aspect 19: The method of any of aspects 10 through 18, further comprising: receiving a plurality of feedback messages, wherein each feedback message of the plurality of feedback messages is associated with a component carrier of the plurality of component carriers and is based at least in part on a respective HARQ process identifier.

Aspect 20: An apparatus for wireless communications at a UE, comprising a processor; memory coupled with the processor; and instructions stored in the memory and executable by the processor to cause the apparatus to perform a method of any of aspects 1 through 9.

Aspect 21: An apparatus for wireless communications at a UE, comprising at least one means for performing a method of any of aspects 1 through 9.

Aspect 22: A non-transitory computer-readable medium storing code for wireless communications at a UE, the code comprising instructions executable by a processor to perform a method of any of aspects 1 through 9.

Aspect 23: An apparatus comprising a processor; memory coupled with the processor; and instructions stored in the memory and executable by the processor to cause the apparatus to perform a method of any of aspects 10 through 19.

Aspect 24: An apparatus comprising at least one means for performing a method of any of aspects 10 through 19.

Aspect 25: A non-transitory computer-readable medium storing code the code comprising instructions executable by a processor to perform a method of any of aspects 10 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
a processor;
memory coupled with the processor; and
instructions stored in the memory and executable by the processor to cause the apparatus to:
receive first control signaling comprising one or more parameters associated with a hybrid automatic repeated request (HARQ) process;
receive second control signaling indicating scheduling information associated with a plurality of component carriers, wherein the scheduling information comprises one or more HARQ process identifier offsets; and
determine a HARQ process identifier associated with each component carrier of the plurality of component carriers based at least in part on the one or more parameters in the first control signaling and a respective HARQ process identifier offset from the one or more HARQ process identifier offsets in the second control signaling.

2. The apparatus of claim 1, wherein the instructions to receive the second control signaling are executable by the processor to cause the apparatus to:
receive an indication of a first HARQ process identifier associated with a first component carrier of the plurality of component carriers, wherein the scheduling information comprises the first HARQ process identifier, and wherein determining the HARQ process identifier associated with each component carrier of the plurality of component carriers is based at least in part on the first HARQ process identifier.

3. The apparatus of claim 2, wherein the instructions to determine the HARQ process identifier associated with each component carrier of the plurality of component carriers are executable by the processor to cause the apparatus to:
determine a second HARQ process identifier associated with a second component carrier of the plurality of component carriers based at least in part on the first HARQ process identifier, the one or more parameters, and a first HARQ process identifier offset of the one or more HARQ process identifier offsets, wherein the first HARQ process identifier offset is associated with the second component carrier.

4. The apparatus of claim 1, wherein the instructions to receive the first control signaling are executable by the processor to cause the apparatus to:
receive an indication of a quantity of bits associated with a HARQ process identifier offset field, wherein the second control signaling comprises one or more HARQ process identifier offset fields, and wherein the one or more parameters comprises the quantity of bits.

5. The apparatus of claim 4, wherein each HARQ process identifier offset field of the one or more HARQ process identifier offset fields comprises a HARQ process identifier offset of the one or more HARQ process identifier offsets, and wherein each HARQ process identifier offset of the one or more HARQ process identifier offsets is associated with a component carrier of the plurality of component carriers.

6. The apparatus of claim 4, wherein the quantity of bits associated with the HARQ process identifier offset field is based at least in part on the plurality of component carriers.

7. The apparatus of claim 4, wherein the quantity of bits associated with the HARQ process identifier offset field is a common quantity of bits.

8. The apparatus of claim 1, wherein the instructions to receive the first control signaling are executable by the processor to cause the apparatus to:
receive an indication of a unit of HARQ process identifier offset, wherein the one or more parameters comprises the unit of HARQ process identifier offset.

9. The apparatus of claim 1, wherein the instructions are further executable by the processor to cause the apparatus to:
transmit a plurality of feedback messages based at least in part on the determining, wherein each feedback message of the plurality of feedback messages is associated with a component carrier of the plurality of component carriers and is based at least in part on a respective HARQ process identifier.

10. An apparatus, comprising:
a processor;
memory coupled with the processor; and
instructions stored in the memory and executable by the processor to cause the apparatus to:
transmit first control signaling comprising one or more parameters associated with a hybrid automatic repeated request (HARQ) process; and
transmit second control signaling indicating scheduling information associated with a plurality of component carriers, wherein the scheduling information comprises one or more HARQ process identifier offsets, wherein each HARQ process identifier offset of the one or more HARQ process identifier offsets indicates a respective HARQ process identifier associated with a component carrier of the plurality of component carriers.

11. The apparatus of claim 10, wherein the instructions to transmit the second control signaling are executable by the processor to cause the apparatus to:
transmit an indication of a first HARQ process identifier associated with a first component carrier of the plurality of component carriers, wherein the scheduling information comprises the first HARQ process identifier.

12. The apparatus of claim 10, wherein the instructions to are executable by the processor to cause the apparatus to:
transmit an indication of a quantity of bits associated with a HARQ process identifier offset field, wherein the second control signaling comprises one or more HARQ process identifier offset fields comprising the one or more HARQ process identifier offsets, and wherein the one or more parameters comprises the quantity of bits.

13. The apparatus of claim 12, wherein each HARQ process identifier offset field of the one or more HARQ process identifier offset fields comprises the respective HARQ process identifier offset of the one or more HARQ process identifier offsets.

14. The apparatus of claim 12, wherein the quantity of bits associated with the HARQ process identifier offset field is based at least in part on the plurality of component carriers.

15. The apparatus of claim 12, wherein the quantity of bits associated with the HARQ process identifier offset field is a common quantity of bits.

16. The apparatus of claim 10, wherein the instructions to transmit the first control signaling are executable by the processor to cause the apparatus to:
transmit an indication of a unit of HARQ process identifier offset, wherein the one or more parameters comprises the unit of HARQ process identifier offset.

17. The apparatus of claim 16, wherein the instructions are further executable by the processor to cause the apparatus to:
determine the unit of HARQ process identifier offset based at least in part on a HARQ process identifier field size, a quantity of HARQ processes, or both.

18. The apparatus of claim 16, wherein the instructions are further executable by the processor to cause the apparatus to:
determine the unit of HARQ process identifier offset to be 1.

19. The apparatus of claim 10, wherein the instructions are further executable by the processor to cause the apparatus to:
receive a plurality of feedback messages, wherein each feedback message of the plurality of feedback messages is associated with a component carrier of the plurality of component carriers and is based at least in part on a respective HARQ process identifier.

20. A method for wireless communications at a user equipment (UE), comprising:
receiving first control signaling comprising one or more parameters associated with a hybrid automatic repeated request (HARQ) process;
receiving second control signaling indicating scheduling information associated with a plurality of component carriers, wherein the scheduling information comprises one or more HARQ process identifier offsets; and
determining a HARQ process identifier associated with each component carrier of the plurality of component carriers based at least in part on the one or more parameters in the first control signaling and a respective HARQ process identifier offset from the one or more HARQ process identifier offsets in the second control signaling.

21. The method of claim 20, wherein receiving the second control signaling comprises:
receiving an indication of a first HARQ process identifier associated with a first component carrier of the plurality of component carriers, wherein the scheduling information comprises the first HARQ process identifier, and wherein determining the HARQ process identifier associated with each component carrier of the plurality of component carriers is based at least in part on the first HARQ process identifier.

22. The method of claim 21, wherein determining the HARQ process identifier associated with each component carrier of the plurality of component carriers comprises:
determining a second HARQ process identifier associated with a second component carrier of the plurality of component carriers based at least in part on the first HARQ process identifier, the one or more parameters, and a first HARQ process identifier offset of the one or more HARQ process identifier offsets, wherein the first HARQ process identifier offset is associated with the second component carrier.

23. The method of claim 20, wherein receiving the first control signaling comprises:
receiving an indication of a quantity of bits associated with a HARQ process identifier offset field, wherein the second control signaling comprises one or more HARQ process identifier offset fields, and wherein the one or more parameters comprises the quantity of bits.

24. The method of claim 23, wherein each HARQ process identifier offset field of the one or more HARQ process identifier offset fields comprises a HARQ process identifier offset of the one or more HARQ process identifier offsets, and wherein each HARQ process identifier offset of the one or more HARQ process identifier offsets is associated with a component carrier of the plurality of component carriers.

25. The method of claim 23, wherein the quantity of bits associated with the HARQ process identifier offset field is based at least in part on the plurality of component carriers.

26. The method of claim 23, wherein the quantity of bits associated with the HARQ process identifier offset field is a common quantity of bits.

27. The method of claim 20, wherein receiving the first control signaling comprises:
receiving an indication of a unit of HARQ process identifier offset, wherein the one or more parameters comprises the unit of HARQ process identifier offset.

28. The method of claim 20, further comprising:
transmitting a plurality of feedback messages based at least in part on the determining, wherein each feedback message of the plurality of feedback messages is associated with a component carrier of the plurality of component carriers and is based at least in part on a respective HARQ process identifier.

29. A method for wireless communications at a network entity comprising:
transmitting first control signaling comprising one or more parameters associated with a hybrid automatic repeated request (HARQ) process; and
transmitting second control signaling indicating scheduling information associated with a plurality of component carriers, wherein the scheduling information comprises one or more HARQ process identifier offsets, wherein each HARQ process identifier offset of the one or more HARQ process identifier offsets indicates a respective HARQ process identifier associated with a component carrier of the plurality of component carriers.

30. The method of claim 29, wherein transmitting the second control signaling comprises:
transmitting an indication of a first HARQ process identifier associated with a first component carrier of the plurality of component carriers, wherein the scheduling information comprises the first HARQ process identifier.

* * * * *